(12) United States Patent
Tschida et al.

(10) Patent No.: US 8,720,874 B2
(45) Date of Patent: May 13, 2014

(54) BALL ACTUATED LOCK PIN

(75) Inventors: Steven J. Tschida, Harris, MN (US); David L. Schmidt, Zimmerman, MN (US)

(73) Assignee: Kurt Manufacturing Company, Inc., Coon Rapids, MN (US)

(*) Notice: Subject to any disclaimer, the term of this patent is extended or adjusted under 35 U.S.C. 154(b) by 153 days.

(21) Appl. No.: 13/210,520

(22) Filed: Aug. 16, 2011

(65) Prior Publication Data
US 2012/0054998 A1 Mar. 8, 2012

Related U.S. Application Data

(60) Provisional application No. 61/380,829, filed on Sep. 8, 2010.

(51) Int. Cl.
*B23Q 1/03* (2006.01)
(52) U.S. Cl.
USPC ........... 269/48.1; 269/229; 411/348; 411/337
(58) Field of Classification Search
USPC ........ 269/48.1, 53, 43, 229, 231, 900, 24–27, 269/32; 411/348, 347, 337
See application file for complete search history.

(56) References Cited

U.S. PATENT DOCUMENTS

| | | |
|---|---|---|
| 1,923,025 A | 8/1933 | Morse et al. |
| 2,564,138 A | 8/1951 | Walker |
| 2,880,638 A | 4/1959 | Muggli |
| 2,901,804 A * | 9/1959 | Williams ...................... 411/348 |
| 3,085,462 A * | 4/1963 | Myers ........................... 411/348 |
| 3,397,880 A | 8/1968 | Kuban |
| 3,498,653 A | 3/1970 | McCreery |
| 4,043,547 A | 8/1977 | Glomb et al. |
| 4,135,418 A | 1/1979 | McCray et al. |
| 4,383,682 A | 5/1983 | Feinberg |
| 5,037,075 A | 8/1991 | Durfee, Jr. |
| 5,121,908 A | 6/1992 | Shatkus et al. |
| 5,193,791 A | 3/1993 | Schwarz |

(Continued)

OTHER PUBLICATIONS

Jergens, Inc. Brochure "Ball Lock® Mounting System," pp. 6-37.

(Continued)

*Primary Examiner* — Lee D Wilson
(74) *Attorney, Agent, or Firm* — Steven M. Koehler; Westman, Champlin & Koehler, P.A.

(57) ABSTRACT

A lock pin assembly used for clamping two plates together, that have aligning bores for receiving the lock pin assembly. The lock pin assembly includes radially extending pins that can be forced outwardly from the center of a lock pin housing forming a part of the lock pin assembly. The actuator pins are forced outwardly and cooperate with a tapered surface on a bottom plate to create a clamping force relative to an end of the lock pin housing supportable on a top plate. The lock pin housing has cam tracks on an outer side thereof, and an actuator ring surrounds and supports the pin and carries cam followers sliding in the cam tracks. The cam tracks are made such that relative rotation of the lock pin housing and the actuator ring changes the axial location of the actuator ring along the housing. The actuator ring rests on the top plate and when the actuator pins are released so they can retract and the lock pin housing and the actuator ring are relatively rotated, the lock pin housing is raised relative to the two plates to aid in removing the lock pin assembly.

20 Claims, 9 Drawing Sheets

(56) References Cited

U.S. PATENT DOCUMENTS

| | | |
|---|---|---|
| 5,419,540 A | 5/1995 | Teafatiller |
| 5,611,650 A | 3/1997 | Perkins et al. |
| 5,845,898 A | 12/1998 | Halder et al. |
| 6,012,712 A | 1/2000 | Bernstein |
| 6,371,469 B1 * | 4/2002 | Gray ................... 269/48.1 |
| 6,464,216 B2 | 10/2002 | Weaver et al. |
| 6,672,578 B1 | 1/2004 | Martens |
| 6,773,210 B2 | 8/2004 | Erickson |
| D596,921 S | 7/2009 | Hageman et al. |
| 7,731,465 B2 * | 6/2010 | Stapulionis et al. ......... 411/348 |
| 7,914,225 B2 | 3/2011 | Hageman |
| 2002/0105128 A1 * | 8/2002 | Hoover ..................... 269/24 |
| 2005/0206059 A1 * | 9/2005 | Hausler, III ................ 269/24 |

OTHER PUBLICATIONS

U.S. Tech, The Global Electronics Publication, vol. 24 No. 3, Publication Date: Mar. 1, 2009.

* cited by examiner

BALL ACTUATED LOCK PIN

CROSS REFERENCE TO RELATED APPLICATION

This application refers to and claims priority on U.S. Provisional Application Ser. No. 61/380,829, filed Sep. 8, 2010, the content of which is hereby incorporated by reference.

BACKGROUND OF THE DISCLOSURE

The present disclosure relates to a lock pin assembly that will clamp two members, such as machining tool plates, together, as is desirable in certain machining operations. The lock pin assembly not only secures the plate members, but it also can be unlocked and removed easily.

At the present time, there are lock pins that will lock two flat plates together with three small balls held in radial bores in a housing. The housing extends through precisely sized bores in the plates or through insert bushings on both of the plates so that a portion of the housing extends through a first plate and into the second or lower plate. The three balls in the housing then are aligned with a groove in the second plate, and upon actuation of the balls outwardly, the plates are locked together. The lock balls will provide a force that holds the plates together, but the housing or pin may be difficult to remove when a side load is placed on the plates (vertical application), or if the bores are not exactly concentric.

SUMMARY OF THE DISCLOSURE

The present disclosure provides a lock pin assembly having a lock pin housing that extends through bores in two members, typically plates, that are clamped together with the lock pin. The lock pin housing has a rotatable actuator on its exterior, at an end of the housing on the exterior of the plate members, and a cooperating cam groove and cam follower between the lock pin housing and actuator provide an axial removal force on the housing as the actuator is rotated relative to the housing. The axial removal force also backs provided lock members carried by the lock pin housing to a retracted position. As disclosed, there is at least one cam groove on the exterior of the lock pin housing, and the rotatable actuator is a ring that has a cam follower in the cam groove. With the actuator ring resting on an outer surface of one of the plate members, (the top plate as shown) when the lock pin housing is rotated while the actuator ring is held stationary (there is relative rotation between the housing and the actuator ring), the pitch of the cam groove around the exterior of the lock pin housing causes an axial force on the lock pin housing to urge it out of the bores in the two clamped plate members. The actuator rings reacts the axial force to the outer surface of the top plate member.

As disclosed there are two cam grooves on the lock pin housing and each has a compound pitch helical configuration that has an initial fine pitch so that very little axial movement of the housing, but high axial force, is provided as the lock pin housing and actuator ring are initially relatively rotated with the lock pin housing in a seated and locked position, and then after the lock pin housing has been loosened and moved axially a short distance, the helical cam grooves increase in pitch so that with little more relative rotation the lock pin housing is moved axially a greater distance for each degree of relative rotation of the actuator ring.

The lock pin housing has three radially extending lock members, in the preferred form, lock pins, extending from a center bore of the housing. The lock members are actuated outwardly by forcing an actuator ball in the center bore of the housing against inclined or cam type surfaces at inner ends of the lock members. The inner ends of the lock members extend into the center bore when they are retracted or unlocked. When the lock pin housing is inserted through a bore in a top plate member and into an aligning bore in a bottom plate member that is to be clamped to the top plate member, a force generator, as shown a set screw mounted in the housing, is used for forcing the actuator ball against the inner end inclined surfaces of the lock members to urge the lock members, pins as disclosed, outwardly from the lock pin housing. The second or lower plate member into which the housing extends has a chamfer shoulder surface around the inner or remote end of the aligning bore in the bottom plate member, and the three lock members are provided with outer end cam surfaces that will engage the chamfer surface and urge the top and bottom plate members to clamp together as the lock members are forced outwardly.

Removing the lock housing is accomplished by releasing the force generator or set screw from the actuator ball, which will permit the lock members to be retracted by an O-ring around the periphery of the lock pin housing that urges the lock members inwardly, and then by holding the actuator ring and rotating the lock pin housing the cam action force moves the housing axially in a direction away from the top plate member, as stated, for extracting the lock pin housing. If the lock members do not retract all the way, the chamfer in the bore in the bottom plate member will act against the outer end camming surfaces of the extended lock members to urge the lock members inwardly as the lock pin housing is moved out of the bores in the plate members. The provision of the fine pitch cam grooves as the actuator ring is initially moved provides an increased retraction force to initially axially move the lock pin housing. The cam grooves on the lock pin housing for the actuator ring can be made with a continuous pitch as well.

While the lock members that are carried by the lock pin housing are disclosed as pins, the lock members can be balls in radial bores of the lock pin housing, in that the spherical surfaces of balls provide camming surfaces for extending (or retracting) ball shaped lock members

DETAILED DESCRIPTION OF EXEMPLARY EMBODIMENTS

Figure 1:
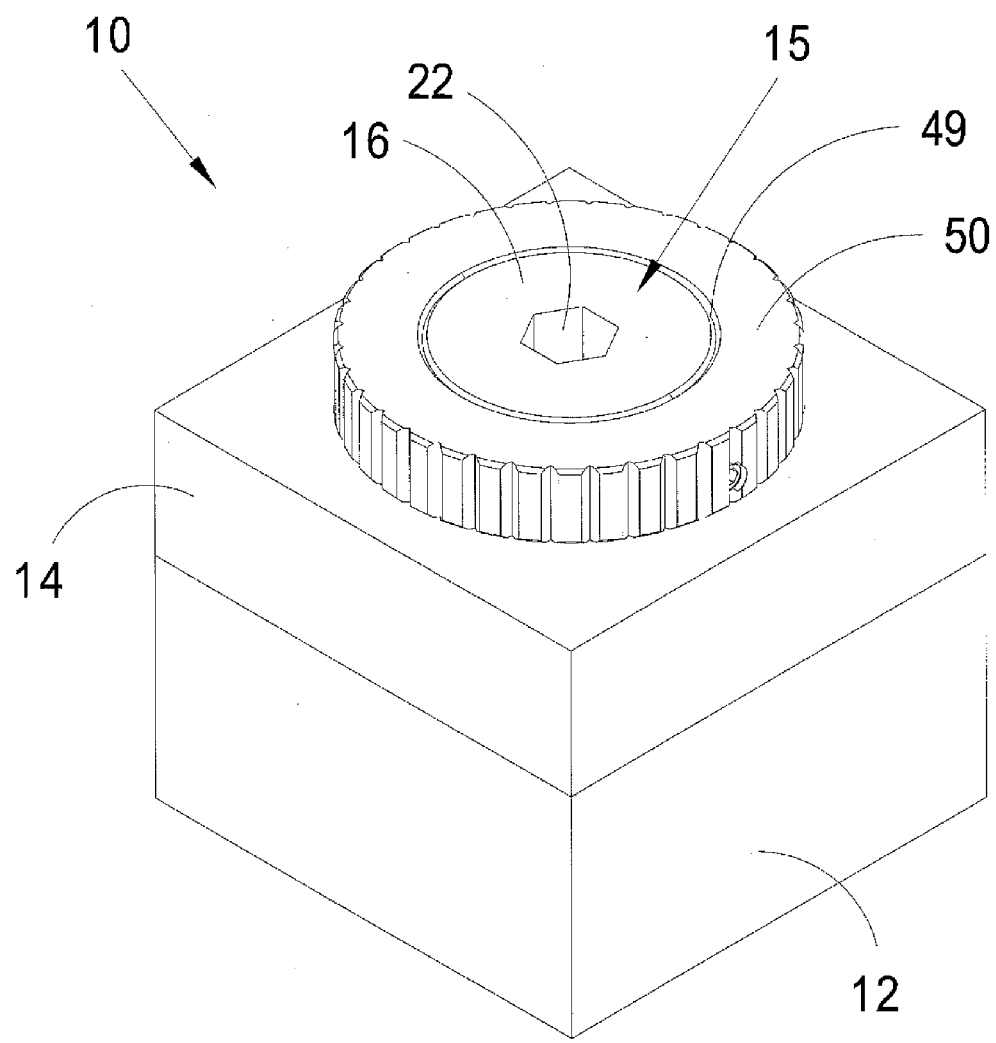
FIG. 1 is a perspective view with a pair of plates held clamped together with a lock pin assembly of the present disclosure.
Figure 2:
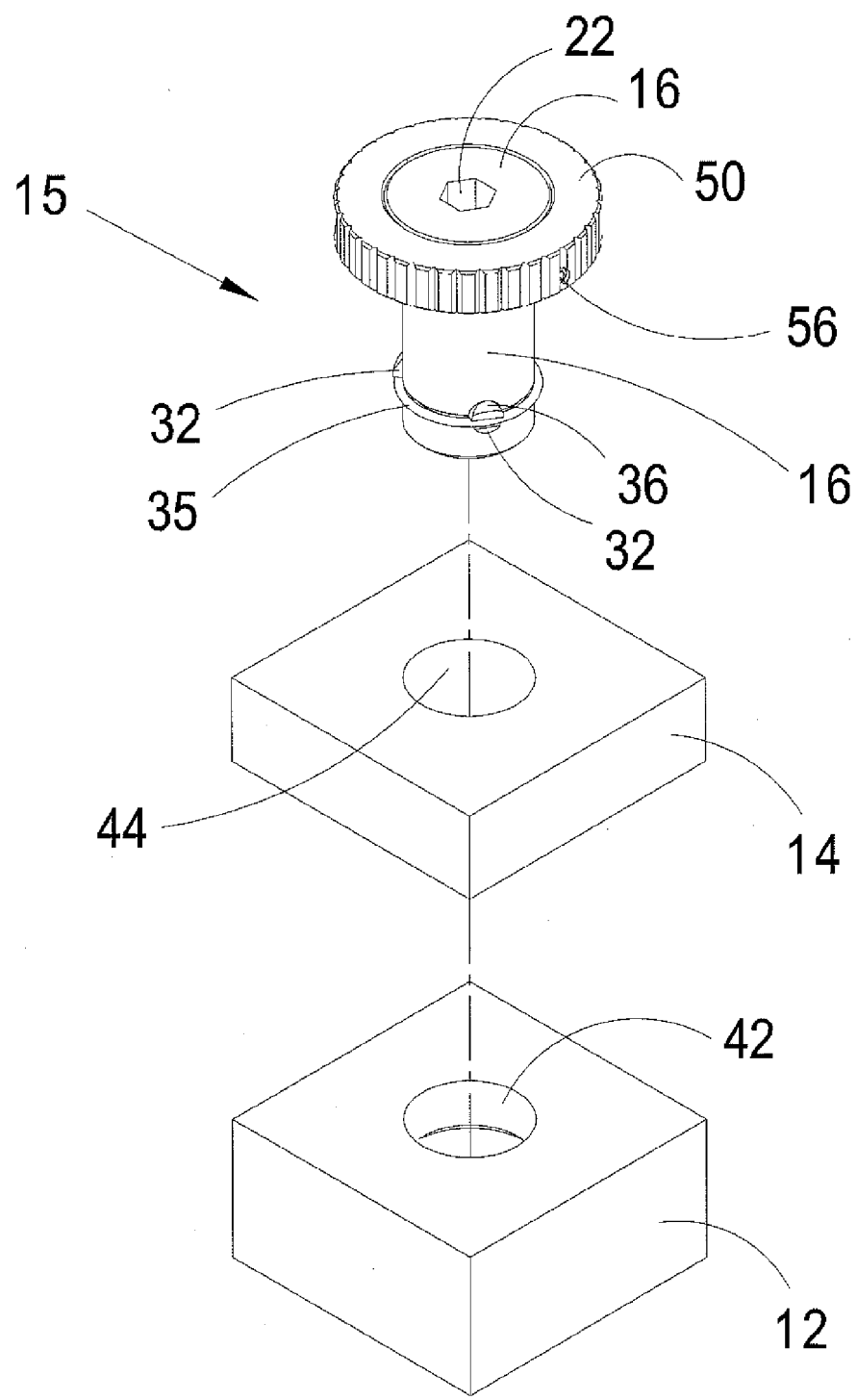
FIG. 2 is an exploded view showing the two plates and the lock pin assembly.
Figure 4:
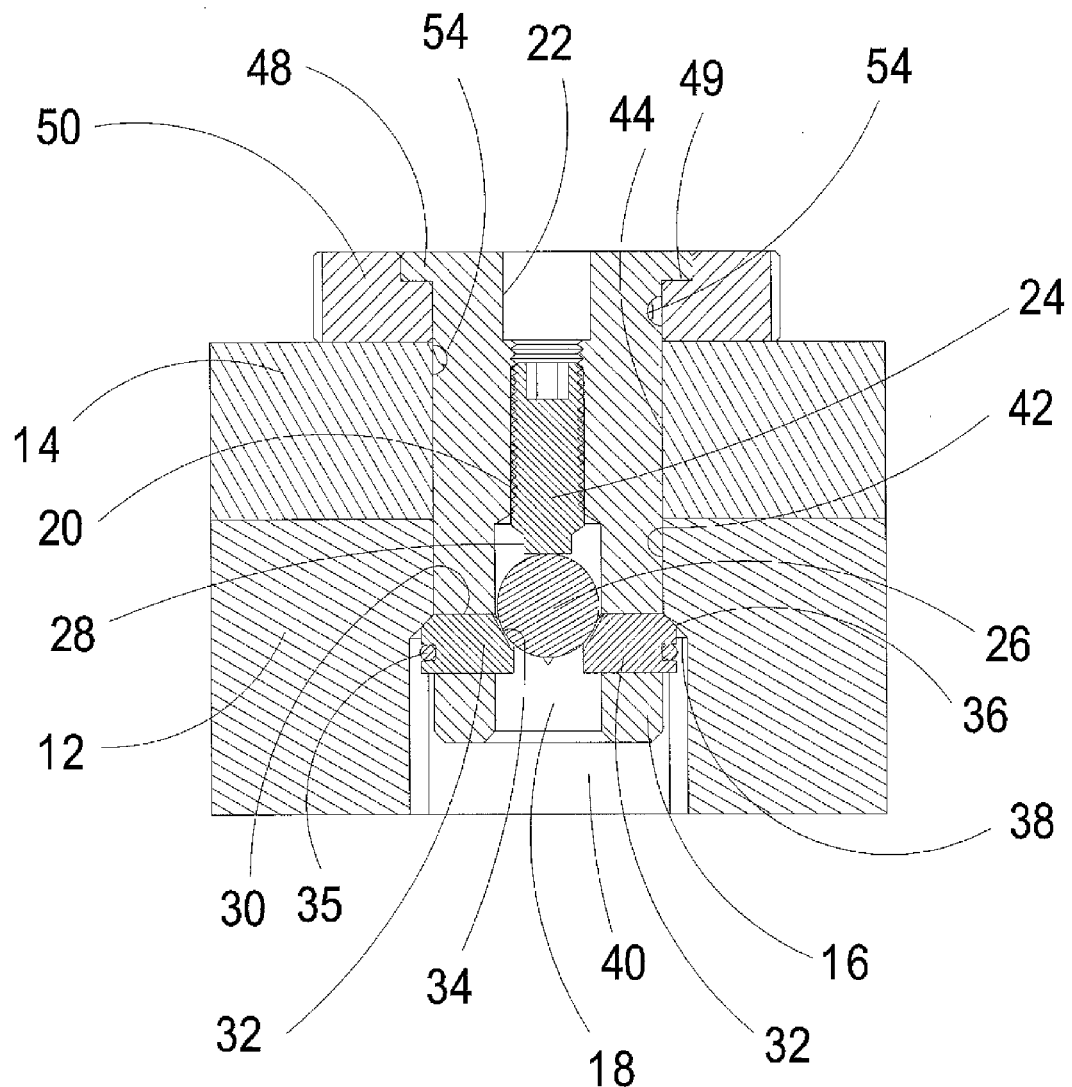
FIG. 4 is a sectional view taken as on line 4-4 in FIG. 3.
Figure 5:
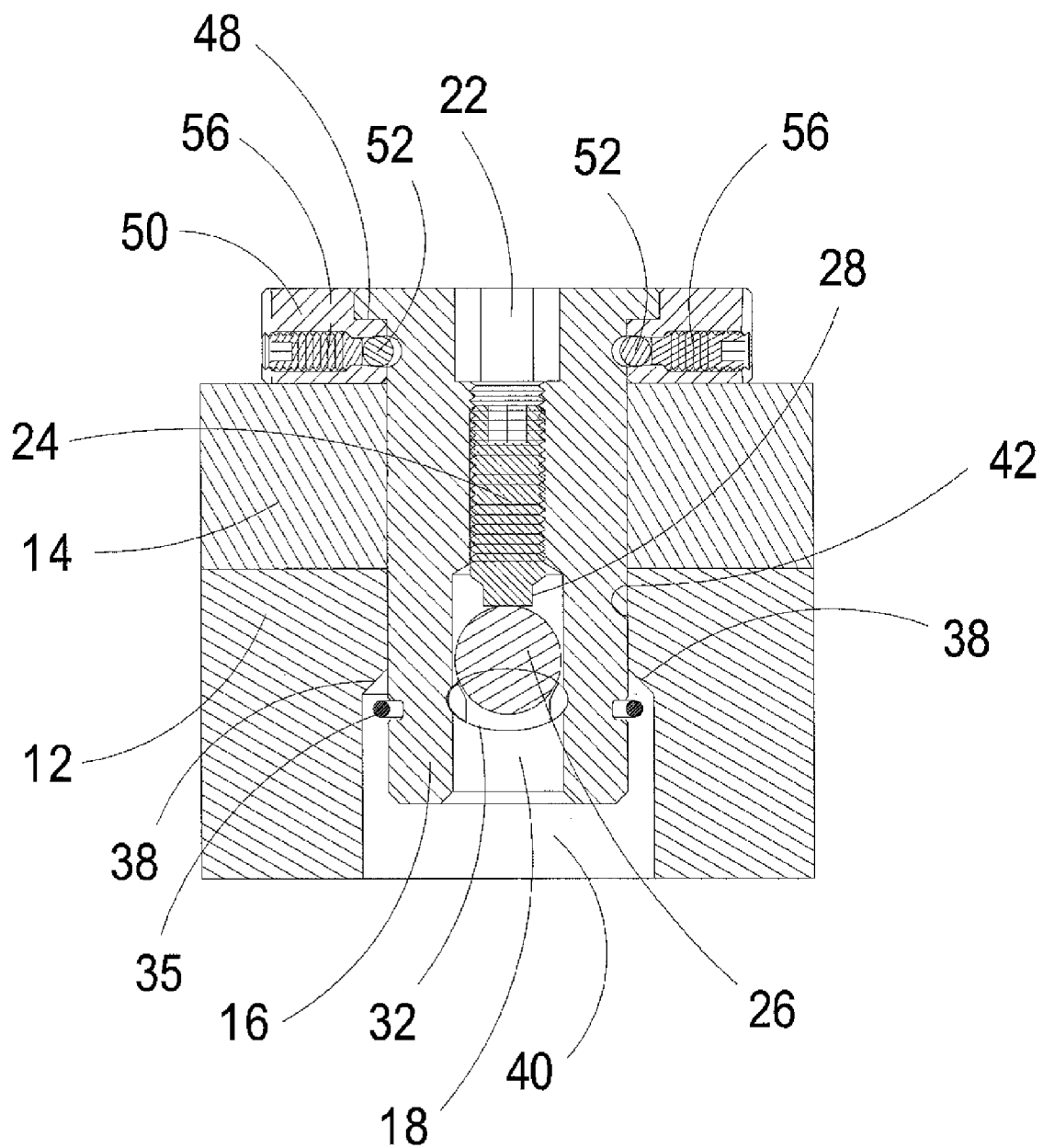
FIG. 5 is a sectional view taken as on line 5-5 in FIG. 3.

In FIG. 1, a plate assembly indicated generally at 10 is made up of a first base plate member 12 (also called a receiver plate), and a second top plate member 14 (also called a sub plate), which are locked or clamped together, using a lock pin assembly 15 made according to the present disclosure. The lock pin assembly 15, as seen in FIGS. 4, 5 and other figures includes an outer lock pin housing 16, that has an central end bore portion 18 at an inner end, and this end bore reduces to a smaller diameter threaded bore portion 20. The lock pin housing 16 has a hex shaped socket counter bore 22 at an outer end. An actuator set screw 24 can be threaded into the threaded bore 20. The hex shaped socket counter bore 22 is designed to receive an Allen wrench for rotating the lock pin housing, and is of size to permit a smaller Allen wrench to be placed into the socket head of the actuator set screw 24 for tightening or loosening the set screw. The bore portion 18 is, as stated, larger than the threaded bore portion 20, and is of size to receive an actuator ball 26 which is inserted from the remote end and that is acted on by an end portion 28 of the set screw, as will be explained.

Figure 3:
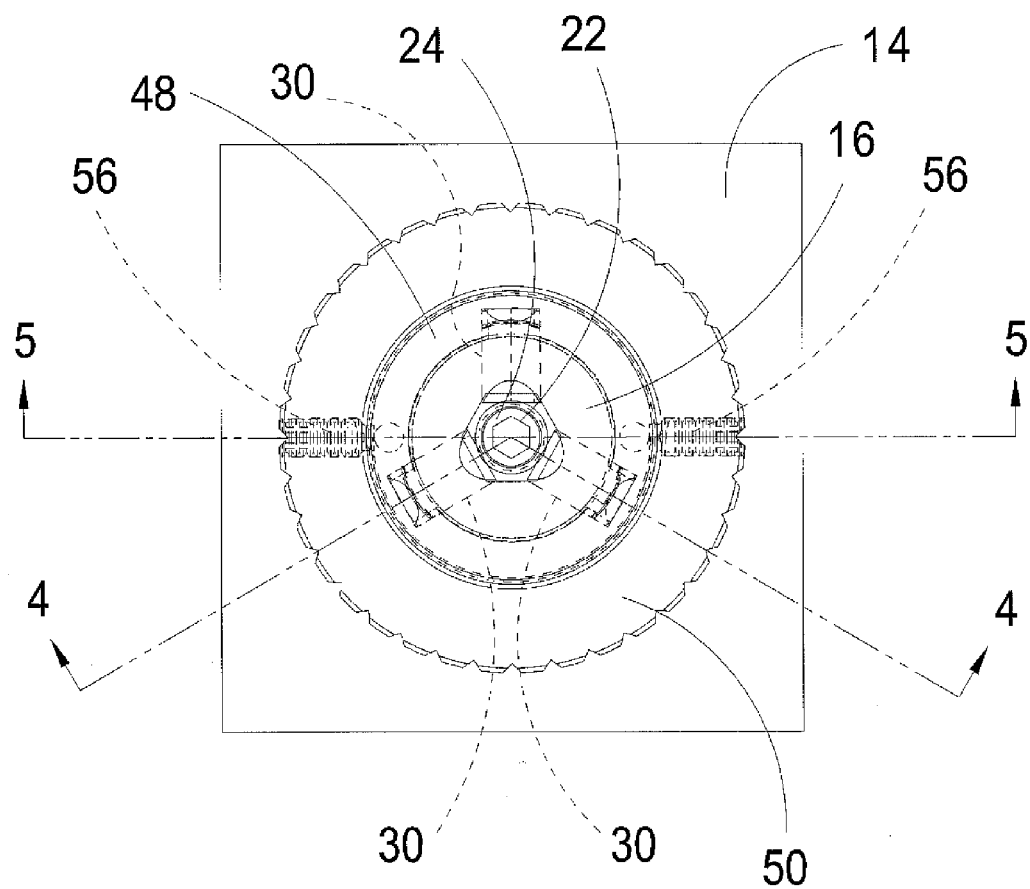
FIG. 3 is a top plan view of the lock pin assembly in place on a pair of plates.

The lock pin housing 16 has three radial bores, which are indicated in dotted lines in FIG. 3 at 30. FIG. 4 is a sectional view taken through the centers of two of the bores 30. Each of the bores 30 mounts a lock actuator member or pin 32. The lock actuator members 32 are slidably mounted in the bores 30 and each has an inner end actuator surface 34 against which the actuator ball 26 will act when the set screw 24 is threaded inwardly along the bore 20. The outer ends of the lock actuator members 32 have cam surfaces 36, and these cam surfaces are part cylindrical so they mate with an inwardly tapered annular chamfer surface 38 that surrounds a lower end of a cylindrical lock pin housing receiving alignment bore 42 and which joins a larger cylindrical bore 40 formed in the base plate 12. The lock actuator members 32 (called pins as shown) have grooves at their outer ends and an O-ring 35 fits in the grooves and surrounds the lock pin housing 16 and the lock actuator pins 32 to urge the pins 32 inwardly in toward the central bore 18 of the lock pin housing 16.

Bore 40 in the base or bottom plate 12 thus is shouldered by the chamfer or inclined surface 38. The smaller first alignment bore portion 42 in plate 12 adjacent to the second or upper plate 14 is bored to be exactly the same size as a second alignment bore 44 formed in the upper plate 14. The bores 42 and 44 closely receive the outer surface of the cylindrical lock pin housing 16, and as can be seen the remote end portion of the housing 16 extends through the alignment bore portion 42 and sufficiently far into the bore 40 so that the lock actuator pins 32 and the cam surfaces 36 of these pins or members will engage the chamfered surface 38.

Figure 6:
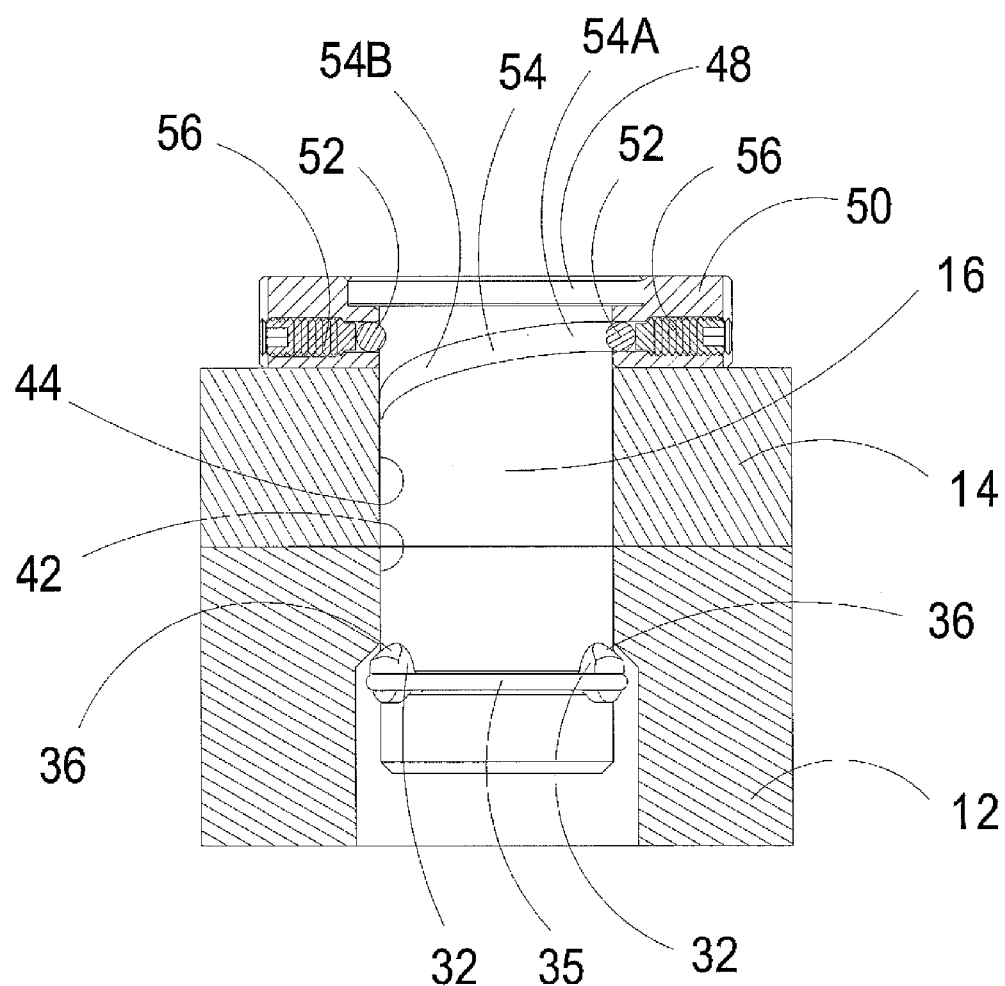
FIG. 6 is a fragmentary view of a cam track portion, and an actuator ring carrying cam followers with the lock pin assembly in a first fully engaged position.
Figure 7:
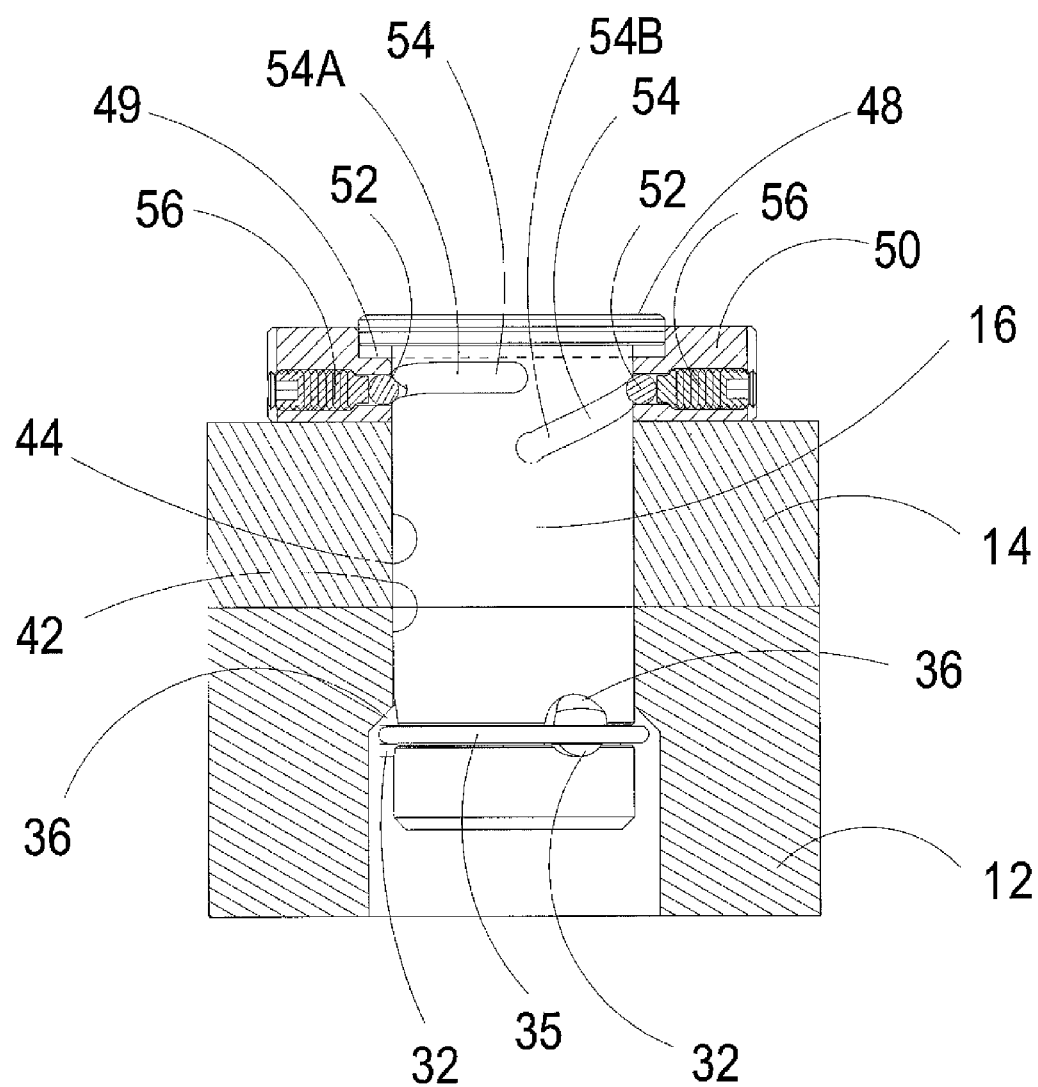
FIG. 7 is a view taken 90° from FIG. 6, showing the actuator ring in a second position with a lock pin housing partially retracted from the bores in the two plates under cam action.

The upper end of the lock pin housing 16 has a shoulder flange 48, and an actuator collar or ring 50 has a center bore through which the lock pin housing 16 extends. The actuator ring 50 is positioned around the lock pin housing 16 at the upper end of the housing and has a groove 49 that receives the flange 48. The actuator ring 50 supports the end of lock pin housing 16 on the upper surface of plate 14. The lock pin housing 16 also has helical cam grooves or tracks formed into the cylindrical exterior surface as shown in FIGS. 6 and 7. There are, as shown, a pair of the helical cam grooves or tracks 54, each of which, as shown, extends substantially 180° around the outer surface of the lock pin housing 16. The cam grooves 54 may extend more or less than 180°, if desired. The actuator ring 50 has a pair of radial bores 180° apart that are of size to receive cam follower balls 52, and these cam follower balls are held in place with cap screws 56, that extend inwardly from the outer edge of the actuator ring 50. The cam follower balls 52 are of size to fit into the respective grooves 54, and they form cam actuators (one in each groove) that will create, when the ring 50 is resting on the top plate 14 and held from rotation and the lock pin housing 16 is rotated using an Allen wrench in socket 22, an axial force along the axis of the housing 16 by the cam action. The number of cam follower balls can be varied, depending on the number of cam grooves provided.

The helical cam grooves 54, as shown and preferably, have compound pitches or inclines and, as shown, each has a first section 54A that has very little pitch, or in other words, very little change in axial position relative to the axis of the lock pin housing 16 for substantially 90° around the housing. Then there is a second higher pitch section 54B for each of the cam grooves that has a substantial change in axial position for each degree of rotation of the actuator ring 50 about the lock pin housing 16. The incline or angle of groove section 59B relative to the longitudinal axis of the housing 16 changes at a greater rate than the first cam groove section 54A.

This means that there is a differential in the amount of force that is exerted axially on the lock pin housing 16 for each degree of rotation of the ring 50 relative to the lock pin housing 16 as the ring 50 is rotated around the housing between the movement along first cam track section 54A and movement along second cam track section 54B. The cam grooves may be single pitch and extend more or less than 180°, if desired.

FIG. 4 shows the set screw 24 threaded against the actuator ball 26 to force the lock actuator pins 32 outwardly in the bores 30 and against the chamfer surface 38 so that the lock cam surfaces 36 provide a force urging the plates 12 and 14 together due to the fact that the flange 48 bears on the collar or ring 50, which in turn bears against the upper surface of the plate 14.

The two plates 12 and 14 are clamped or locked tightly together, as shown in FIGS. 4 and 5. While only one lock pin assembly 15 is illustrated, typically two or more lock pin assemblies are used for securing the plates in use. When the plates are to be separated or released, the actuator set screw 24 is loosened by putting an Allen wrench through the bore 22 and into the socket head of set screw 24, and then backing the actuator set screw away from the actuator ball 26. In use, the plates 12 and 14 may shift slightly, or the plates may be positioned so the bores in the two plates that receive lock pin housing 16 may no longer be exactly concentric. This shifting places a side load on the lock pin housing 16 so removal is difficult, and when there are side loads the present invention aids in removal of the lock pin assembly.

In order to permit removal of the lock pin housing 16 under friction or side loads and/or retract the lock actuator pins 32, and thus permit the plates 12 and 14 to be separated, a large Allen wrench is placed into the socket 22 of the lock pin housing 16 and the lock pin housing 16 is rotated, while the actuator ring 50 is held relative to the plate 14 and the lock pin housing. While the actuator ring can usually be held manually, if needed, a wrench can be used to hold the actuator ring 50 from rotating. When there is relative rotation between the lock pin housing and the actuator ring, the cam follower balls 52 follow along the cam track sections 54A, exerting a substantial force in axial direction on the lock pin housing 16 relative to the plates 14 and 12, because of the low pitch of the cam track section 54A during the initial relative rotation between the lock pin housing 16 and the actuator ring 50. This axial force will move the lock pin housing 16 axially upwardly, even under side loads, as the lock pin housing is lifted relative to the top of plate 14. Again, the actuator ball 26 has been loosened, and the O-ring 35 will act to retract the lock pins 32, but if the lock pins are not fully retracted, once the lock pin housing 16 starts to move axially, the pins 32 will also tend to be retracted by the chamfer surface 38 acting against the outer end camming surfaces 36. Then, as the lock pin housing is rotated more, after it is initially loosened, the second higher pitch portion 54B of the cam groove or track will cause a relatively rapid axial movement of the lock pin housing 16 as the lock pin housing is rotated with the cam follower balls 52 in the higher pitch cam groove section. The housing 16 lifts and it can be gripped or pried on to pull it out through the bore 42. The plate 14 can then be separated from the plate 12. The fine pitch of the cam grooves or tracks provides increased pull out force when it is needed most, but, again, the cam tracks can be a constant pitch or a different compound pitch.

Figure 8:
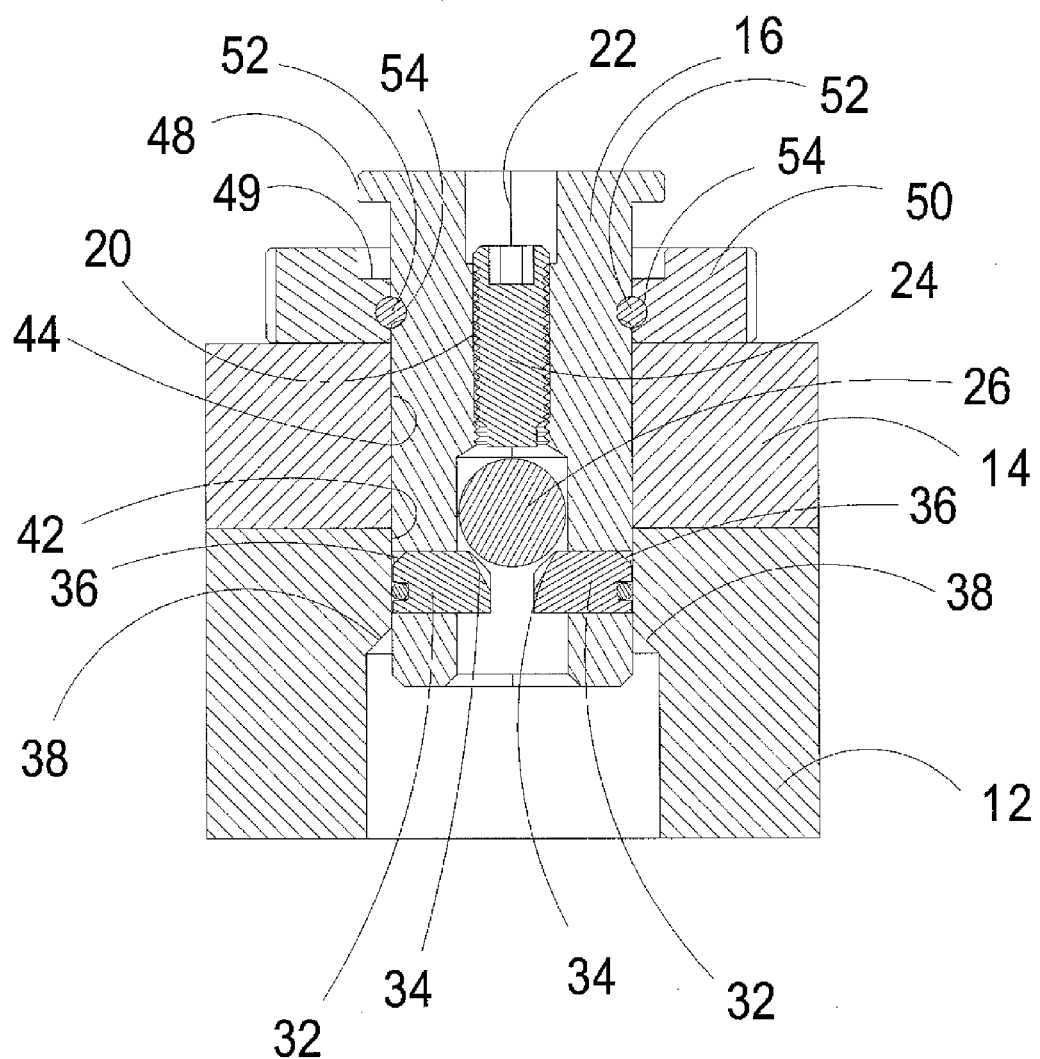
FIG. 8 is a sectional view similar to FIG. 4 with the lock pin housing retracted the maximum amount using the cam track and actuator ring.
Figure 9:
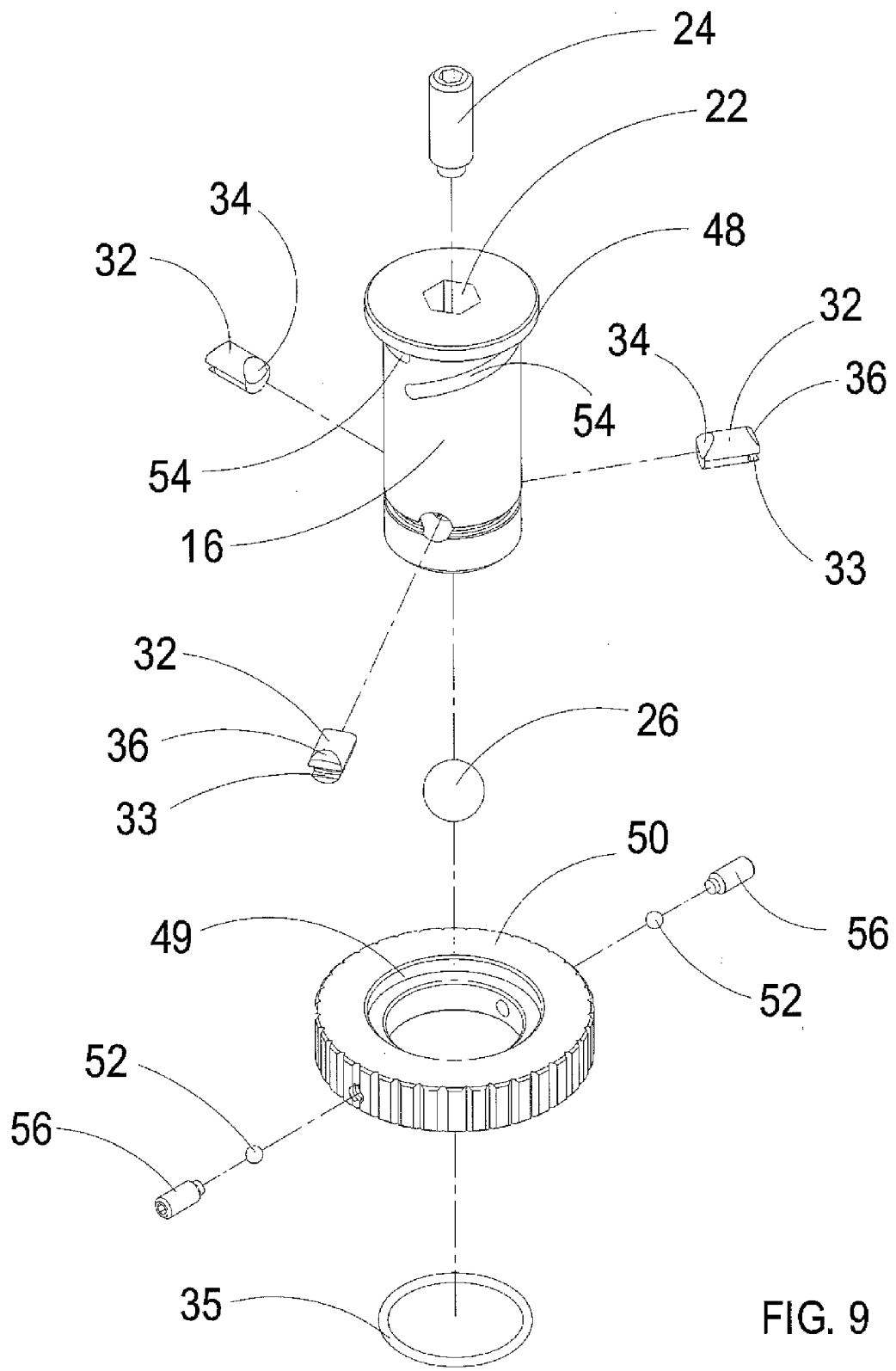
FIG. 9 is an exploded view of the lock pin assembly of the present disclosure.

The housing 16 is shown partially retracted upwardly to release the plates in FIG. 7, where it can be seen that the flange 48 is spaced upwardly from the bottom of the groove 49 in the ring 50 that receives the flange 48, and that the balls 52 traveling in the cam tracks 54 have forced the lock pin housing 16 upwardly. The actuator lock members or pins 32 will be at least partially retracted into the bores 30 in this position. The lock actuator pins 32, as shown in FIG. 8, will be fully retracted when the housing 16 and actuator ring 50 are rotated relative to each other so the cam follower balls 52 are moved to the ends of the cam track sections 54B.

When two plates are to be locked or clamped together, such as the plates 12 and 14, the aligning first and second bores are formed for receiving the lock pin housing 16 and one of the bores is provided with a chamfered surface surrounding the aligning bore at the remote end in one of the plates, and in this instance, the chamfered surface is at a shoulder that is formed by a larger bore 40 extending more remotely than the aligning bore 42 in plate 12. The two plates are placed together, and the aligning bores 42 and 44 are aligned. The lock pin housing 16 is then inserted with the actuator ring 50 rotated to a position with the cam follower balls 52 at the start end of the cam track sections 54A, so that the flange 48 is seated on recess 49 and the actuator ring 50 is resting on the upper surface of top plate 14, The set screw 24 is backed outwardly so the actuator lock pins 32 may be retracted and the O-ring 35 has urged the pins 32 inwardly. Then, the lock pin housing 16 can be inserted into the two aligning bores in the plates 12 and 14. The chamfered surface 38 is machined so that with the housing 16 seated in the bores, with the flange 48 seated on the groove 49 and the actuator ring 50 resting on the top surface of plate 14 to support the lock pin housing 16 on plate 14, the pins 32 are at a level or at a plane perpendicular to the axis of the housing 16 so the surfaces 36 will engage the chamfered surface 38. The lock pin housing 16 is seated with the actuator ring 50 resting on the top surface of plate 14, to properly position the actuator lock pins 32. The set screw 24 is then driven inwardly with an Allen wrench against the actuator ball 26 to force the pins 32 out of bores 30 to engage the chamfered surface 38 and tightly lock the two plates 12 and 14 together.

This locking arrangement or clamping arrangement using the lock pin assembly disclosed can be used for various applications in addition to use in the machine tool industry. The members that are clamped together can be any selected parts, plates or members. The removal of the lock pin housing 16 to release the two clamped members is done as previously described.

The drawings disclose the bores in the plates formed directly in the plate material. In practice, the plates can be bored with larger holes and inserts that have bores for receiving the lock pin housing and with one insert, for the lower plate, formed with the chamfer 38, installed in the larger bores. The inserts can be secured in the larger bores, and also can be hardened.

The description and drawings show the cam groove on the lock pin housing and the cam follower carried by the actuator ring, but the cam groove or track could be formed on the inner surface of the actuator ring facing the housing, and the cam follower carried on the lock pin housing.

Although the present invention has been described with reference to preferred embodiments, workers skilled in the art will recognize that changes may be made in form and detail without departing from the spirit and scope of the invention.

What is claimed is:

1. A lock assembly comprising a lock housing having an outer surface of size to fit within aligning first and second bores of first and second members that are to be clamped together, with a first bore in the first member having a chamfered surface surrounding the bore at an end of the first bore remote from the second member, the lock housing having a second end and having a central bore extending along an axially length of the lock housing, a plurality of radially extending bores in the lock housing adjacent the first end of the lock housing and extending from the outer surface to the central bore, a separate lock actuator member in each of the radial bores, each lock actuator member having a second camming surface at an outer end, an actuator in the central bore of the lock housing operable to provide a force on the first camming surface of the lock actuator members to urge the lock actuator members outwardly of the lock housing so the second camming surfaces extend out from the lock housing, an actuator ring rotatably mounting the second end of the lock housing and the actuator ring being supportable on an outer surface of the second member opposite from the first member, and the lock housing having at least one cam track on the outer surface thereof adjacent an end spaced from the radial bores, the actuator ring having a cam follower fitting in the at least one cam track, the cam track having a pitch such that relative rotation of the lock housing and the actuator ring as the cam follower moves along the cam track changes the axial position of the lock housing relative to the actuator ring.

2. The lock assembly of claim 1, wherein the first and second members comprise a receiver plate and a sub plate for machining operations, respectively, and wherein the lock actuator members comprise lock actuator pins slidably mounted in the radial bores.

3. The lock assembly of claim 2 wherein the actuator in the central bore for engaging the inner ends of the lock actuator pins comprises a ball, and a screw threadably mounted in a threaded portion of the central bore and threadable to urge the ball against the first camming surfaces of the lock actuator pins to force them outwardly, the ball being in a portion of the central bore that is larger in diameter than the threaded portion.

4. The lock assembly of claim 2 and an elastic ring surrounding the lock pin housing and mounted to engage outer ends of the lock actuator pins to urge the lock actuator pins inwardly along the radial bores.

5. The lock assembly of claim 1, comprising the center bore having first and second portions, with the second portion larger diameter than the first portion, the radial bores being open to the second portion, the first portion of the central bore being threaded, and the actuator in the central bore of the lock housing comprising a screw threadable in the threaded first portion of the central bore.

6. The lock assembly of claim 5, the actuator in the central bore further comprising a ball member in the larger second portion of the central bore between the lock actuator members and an end of the screw threaded in the central bore, the screw being adapted to engage the ball to force the ball against the first camming surfaces of the lock actuator members.

7. A lock pin assembly comprising a lock pin housing having an outer surface of size to fit within aligning first and second bores of first and second members to be clamped together, the lock pin assembly having locking members in the lock pin housing that are operable to engage and clamp the first and second members together, an actuator ring supporting and surrounding a first end of the lock pin housing and being rotatable relative to the lock pin housing, at least one cam groove formed in a facing surface of one of the lock pin housing and the actuator ring, and a cam follower carried by the other of the lock pin housing and the actuator ring and engaging the cam groove, whereby relative rotation of the lock pin housing and the actuator ring changes the axial position of the actuator ring relative to a central axis of the lock pin housing.

8. The lock pin assembly of claim 7 wherein the cam groove has a differing pitch relative to a central axis of the lock pin housing in different positions of the cam groove.

9. The lock pin assembly of claim 8 wherein the pitch of the cam groove is such that change in axial position of the actuator ring relative to the central axis of the lock pin housing is less for each degree of rotation from an initial position of the actuator ring than after the actuator ring and lock pin housing have relatively rotated a selected a number of degrees from the initial position.

10. The lock pin assembly of claim 7 wherein the cam groove is formed in an outer surface of the lock pin housing and the cam follower is carried by the actuator ring.

11. The lock pin assembly of claim 10 wherein the cam groove is adjacent the first end of the lock pin housing, and the locking members comprise radially extendable lock members spaced from the first end of the lock pin housing.

12. The lock pin assembly of claim 7 wherein each of the lock members comprises a slidable pin.

13. The lock pin assembly of claim 12 wherein each pin is guided radially and includes a first camming surface inclined upwardly toward the first end, the lock pin housing including a central bore and an actuator movable axially to engage the first camming surfaces.

14. The lock pin assembly of claim 13 wherein each pin includes an outwardly facing surface at an end opposite the first camming surface, each outwardly facing surface including a groove, and wherein an outer surface of the lock pin housing includes grooves aligned with the grooves of the lock pins, the grooves of the lock pin housing and the grooves of the pins of size to receive ring member configured to urges each of the lock pins toward the actuator.

15. The lock pin assembly of claim 14 wherein each pin includes a second camming surface inclined upwardly toward the first end and disposed on an end opposite the first camming surface.

16. The lock pin assembly of claim 7 wherein lock pin includes surfaces configured to receive a tool to rotate the lock pin housing.

17. The lock pin assembly of claim 16 wherein the surfaces are arranged in a recess provided in an end surface of the first end.

18. The lock pin assembly of claim 17 wherein the surfaces are arranged to receive an Allen wrench.

19. The lock pin assembly of claim 13 wherein an end surface of the first end includes a recess with surfaces configured to receive a tool to rotate the lock pin housing.

20. The lock pin assembly of claim 19 wherein the central bore comprises threads and the actuator includes thread that threadably mate with the threads of the central bore, and wherein the central bore has a diameter less than the recess.

* * * * *